United States Patent
Oshima et al.

(10) Patent No.: US 9,685,660 B2
(45) Date of Patent: Jun. 20, 2017

(54) POSITIVE ELECTRODE FOR LITHIUM-ION SECONDARY BATTERY AND PRODUCTION PROCESS FOR THE SAME, AND LITHIUM-ION SECONDARY BATTERY

(71) Applicant: KABUSHIKI KAISHA TOYOTA JIDOSHOKKI, Kariya-shi, Aichi (JP)

(72) Inventors: Hiroki Oshima, Kariya (JP); Kanae Suzuki, Kariya (JP); Takeshi Maki, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 77 days.

(21) Appl. No.: 14/777,584

(22) PCT Filed: Sep. 10, 2014

(86) PCT No.: PCT/JP2014/004665
§ 371 (c)(1),
(2) Date: Sep. 16, 2015

(87) PCT Pub. No.: WO2016/038644
PCT Pub. Date: Mar. 17, 2016

(65) Prior Publication Data
US 2016/0276656 A1    Sep. 22, 2016

(51) Int. Cl.
| | | |
|---|---|---|
| *H01M 4/36* | (2006.01) |
| *H01M 10/05* | (2010.01) |
| *H01M 4/131* | (2010.01) |
| *H01M 4/1391* | (2010.01) |
| *H01M 4/66* | (2006.01) |
| *H01M 4/04* | (2006.01) |
| *H01M 4/505* | (2010.01) |
| *H01M 4/525* | (2010.01) |
| *H01M 4/62* | (2006.01) |
| *H01M 10/0525* | (2010.01) |
| *H01M 10/42* | (2006.01) |

(52) U.S. Cl.
CPC ......... *H01M 4/366* (2013.01); *H01M 4/0404* (2013.01); *H01M 4/0416* (2013.01); *H01M 4/131* (2013.01); *H01M 4/1391* (2013.01); *H01M 4/625* (2013.01); *H01M 4/661* (2013.01); *H01M 4/505* (2013.01); *H01M 4/525* (2013.01); *H01M 4/62* (2013.01); *H01M 4/622* (2013.01); *H01M 4/623* (2013.01); *H01M 10/0525* (2013.01); *H01M 10/4235* (2013.01); *Y02P 70/54* (2015.11)

(58) Field of Classification Search
None
See application file for complete search history.

(56) References Cited

U.S. PATENT DOCUMENTS

| | | | | |
|---|---|---|---|---|
| 5,985,486 A * | 11/1999 | Giron | ................. | G01N 27/4074 429/188 |
| 6,830,848 B1 * | 12/2004 | Fujiwara | ............... | H01M 4/137 429/213 |
| 2008/0006525 A1 * | 1/2008 | Fanton | .................... | B32B 17/10 204/192.17 |
| 2009/0246630 A1 | 10/2009 | Sakitani et al. | | |

FOREIGN PATENT DOCUMENTS

| | | | |
|---|---|---|---|
| JP | 11-097027 A | | 4/1999 |
| JP | 2007-510267 A | | 4/2007 |
| JP | 2009-099530 A | | 5/2009 |
| JP | 2013-012410 A | | 1/2013 |
| JP | 2014-160635 A | | 9/2014 |
| JP | 2014160635 A | * | 9/2014 |
| JP | 2014-186945 A | | 10/2014 |

OTHER PUBLICATIONS

JP 2014-160635 A English machine translation.*
Japanese Notification of Reasons for Refusal of JP 2013-062497 dated Nov. 6, 2014.
International Search Report of PCT/JP2014/004665 dated Nov. 11, 2014.

* cited by examiner

*Primary Examiner* — Scott J Chmielecki
(74) *Attorney, Agent, or Firm* — Sughrue Mion, PLLC

(57) ABSTRACT

A positive electrode for lithium-ion secondary battery is provided, the positive electrode being able to endure high-temperature and high-voltage driving modes or operations. At least parts of the surface of positive-electrode active-material particles are covered by a polymer coating layer, and an amino group and phosphoric-acid group are included in the polymer coating layer. Since the polymer coating layer includes a phosphoric-acid-based polymer, capacity declines are inhibited at the time of cycle tests.

12 Claims, No Drawings

POSITIVE ELECTRODE FOR LITHIUM-ION SECONDARY BATTERY AND PRODUCTION PROCESS FOR THE SAME, AND LITHIUM-ION SECONDARY BATTERY

CROSS REFERENCE TO RELATED APPLICATIONS

This is a National Stage of International Application No. PCT/JP2014/004665 filed Sep. 10, 2014, the contents of which are incorporated herein by reference in its entirety.

TECHNICAL FIELD

The present invention relates to a positive electrode to be used for lithium-ion secondary battery, to a production process for the same, and a lithium-ion secondary battery using the positive electrode.

BACKGROUND ART

Lithium-ion secondary batteries have high charged and discharged capacities, and are secondary batteries being able to make the outputs high. Currently, the lithium-ion secondary batteries have been used mainly as power sources for portable electronic appliances, and have further been expected as power sources for electric automobiles anticipated to become widespread from now on. The lithium-ion secondary batteries comprise active materials being capable of inserting and eliminating (or sorbing and desorbing) lithium (Li) in the positive electrode and negative electrode, respectively, and lithium ions moving within an electrolytic solution disposed between the two electrodes lead to operating the lithium-ion secondary batteries. A lithium-containing metallic composite oxide, such as lithium/cobalt composite oxides, has been used mainly as an active material of the positive electrode; whereas a carbon material with a multilayered structure has been used mainly as an active material of the negative electrode.

However, since the capacity of the current lithium-ion secondary batteries is not possibly said to be satisfactory, making the current lithium-ion secondary batteries exhibit a much higher capacity has been sought for. As an approach for achieving the target, although making a positive-electrode potential a high voltage has been investigated, the investigation has been associated with such a large problem that, when a battery is driven with a high voltage, especially when a battery is driven at a high temperature with a high voltage, the battery has extremely deteriorated characteristics after being charged and discharged repeatedly. A cause of the problem has been believed to be the oxidation decompositions of an electrolytic solution and electrolyte which occur in the vicinity of a positive electrode when being charged.

That is, the consumption of lithium ions by the oxidation decompositions of an electrolyte in the vicinity of a positive electrode is believed to result in declining a capacity. Moreover, an output is believed to decline because the decomposed products of an electrolytic solution depositing on an electrode surface or in the voids of a separator serve as a resistive matter to act against the lithium-ion conduction. Therefore, to solve such problems, inhibiting the electrolytic solution and electrolyte from decomposing is necessary.

Hence, Japanese Unexamined Patent Publication (KOKAI) Gazette No. 11-097027, Japanese Translation of PCT International Application Publication (KOHYO) Gazette No. 2007-510267, and so on, propose a nonaqueous-electrolyte secondary battery in which a coated layer composed of an ion-conductive polymer, and the like, is formed onto a positive-electrode surface, respectively. The gazettes state that forming the coated layer results in making the following deteriorations inhibitable: the elution of a positive-electrode active material, the decompositions thereof, and so forth.

But, since the gazettes do not at all set forth any evaluation for the nonaqueous-electrolyte secondary batteries when the batteries are charged with such a high voltage as 4.3V or more, the batteries have not been proved clearly yet whether or not being able to endure, such a high-voltage driving mode or operation. Moreover, since the thickness of the coated layers is also on the order of micrometers substantially, the coated layers impede the lithium-ion conduction greatly.

PATENT LITERATURE

Patent Application Publication No. 1: Japanese Unexamined Patent Publication (KOKAI) Gazette No. 11-097027; and Patent Application Publication No. 2: Japanese Translation of PCT International Application Publication (KOHYO) Gazette No. 2007-510267

SUMMARY OF THE INVENTION

Technical Problem

The present invention is made in view of the aforementioned circumstances. An object of the present invention is to provide a positive electrode for lithium-ion secondary battery being able to endure a high-voltage driving mode or operation.

Solution to Problem

Features of a positive electrode for lithium-ion secondary battery according to the present invention solving the aforementioned technical problems lie in that the positive electrode comprises:

a positive-electrode active-material particles;

a polymer coating layer formed on at least parts of surface of said positive-electrode active-material particles; and said polymer coating layer including an amino group, and a phosphoric-acid group.

And, features of a production process according to the present invention for the present positive electrode for lithium-ion secondary battery lie in that the production process comprises the steps of:

forming a positive-electrode active-material layer by applying a slurry onto a surface of a current collector and then drying the slurry thereon, the slurry comprising a binding agent, and positive-electrode active-material particles; and forming a cationic polymer coating layer and then forming a phosphoric-acid-based polymer coating layer by applying onto the positive-electrode active-material layer a cationic polymer solution comprising a solvent and a cationic polymer which is dissolved in the solvent and of which the zeta potential is positive under a neutral condition, and then drying the cationic polymer solution, and subsequently applying onto the cationic polymer coating layer a phosphoric-acid-based polymer solution comprising a solvent and a phosphoric-acid-based polymer, which has a phosphoric-acid group on a side chain thereof and is dissolved in the solvent and of which the zeta potential is negative under a neutral condition, and then drying the phosphoric-acid-based polymer solution.

Advantageous Effects of the Invention

The positive electrode for lithium-ion secondary battery according to the present invention comprises a polymer coating layer formed on at least parts of surface of positive-electrode active-material particles. Since the polymer coating layer covers the positive-electrode active-material particles, the direct contact between the positive-electrode active-material particles and an electrolytic solution is inhibitable at the time of a high-voltage driving mode or operation, and inhibiting the decompositions of the electrolytic solution and an electrolytic salt is enabled.

And, the polymer coating layer includes an amino group, and a phosphoric-acid group. When the polymer coating layer of the present positive electrode includes an amino group and phosphoric-acid group, an advantageous of inhibiting capacity declines in a lithium-ion secondary battery is effected greatly at the time of a cycle test. Moreover, the polymer coating layer has a thickness on the order of nanometers, the polymer coating layer does not at all become a resistance to the lithium-ion conducting property. Therefore, a lithium-ion secondary battery, which not only exhibits a high capacity but also is capable of maintaining high battery characteristics even after a repetitive charging/discharging mode or operation, is providable, because inhibiting the decompositions of an electrolytic solution is enabled even when the lithium-ion secondary battery is driven or operated with a high voltage.

Moreover, in the production process according to the present invention, a cationic polymer coating layer is formed by applying onto a positive-electrode active-material layer a cationic polymer solution comprising a solvent and a cationic polymer, which is dissolved in the solvent and of which the zeta potential is positive under a neutral condition, and then drying the cationic polymer solution; and subsequently a phosphoric-acid-based polymer coating layer is formed by applying onto the cationic polymer coating layer a phosphoric-acid-based polymer solution comprising a solvent and a phosphoric-acid-based polymer, which is dissolved in the solvent and has a phosphoric-acid group on the side chain and of which the zeta potential is negative under a neutral condition, and then drying the phosphoric-acid-based polymer solution. Since the zeta potential directed to the positive-electrode active-material particles directed to the present invention is negative, the positive-electrode active-material particles and cationic polymer coating layer are firmly joined one another by a coulomb force. Moreover, since the zeta potential of the phosphoric-acid-based polymer is negative, the cationic polymer coating layer is also firmly joined to the phosphoric-acid-based polymer coating layer by a coulomb force. Therefore, a thin and uniform polymer coating layer is formable, because both of the cationic polymer coating layer and phosphoric-acid-based polymer coating layer are formable as a thin film, respectively, and because a total thickness of the two polymer coating layers is settable on the order of nanometers.

In addition, since the polymer coating layer is formable using a dipping method, a roll-to-roll process becomes feasible so that the productivity upgrades.

DESCRIPTION OF THE EMBODIMENTS

A positive electrode for lithium-ion secondary battery according to the present invention comprises a current collector, and a positive-electrode active-material layer bound together onto the current collector. As for the current collector, employing current collectors having been used commonly for lithium-ion secondary-battery positive electrodes, and the like, is permissible. As for the current collector, the following are exemplified, for instance: aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel unwoven fabrics, copper foils, copper meshes, punched copper sheets, copper expanded sheets, titanium foils, titanium meshes, carbon nonwoven fabrics, carbon woven fabrics, and so forth.

When the current collector comprises aluminum, forming an electrically-conductive layer including an electrical conductor on a surface of the current collector, and then forming the positive-electrode active-material layer on a surface of the electrically-conductive layer are desirable. The cyclability of a lithium-ion secondary battery is further upgraded by thus forming the two layers. The advantageous effect is believed to result from inhibiting the current collector from eluting out into an electrolytic solution. As for the electrical conductor, the following are exemplified: carbon (such as graphite, hard carbon, acetylene black and furnace black), ITO (i.e., indium-tin-oxide), tin oxide ($SnO_2$), and the like. The electrically-conductive layer of the electrical conductors is formable by a PVD method, a CVD method, and so forth.

Although a thickness of the electrically-conductive layer is not at all restricted especially, setting the thickness at 5 nm or more is preferable. When the thickness becomes thinner than the setting, causing the advantage of upgrading cyclability to take effect becomes difficult.

The positive-electrode active-material layer comprises positive-electrode active-material particles including a positive-electrode active material, a binding portion not only binding the positive-electrode active-material particles together one another but also binding the positive-electrode active-material particles together with the current collector, and the polymer coating layer covering at least parts of surface of the positive-electrode active-material particles.

For the positive-electrode active material, using the following is permissible: metallic lithium, $LiCoO_2$, $LiNiO_2$, $LiMnO_2$, sulfur, and the like. The positive-electrode active material preferably includes an Li compound or solid solution selected from the group consisting of $Li_xNi_aCo_bMn_cO_2$, $Li_xCo_bMn_cO_2$, $Li_xNi_aMn_cO_2$, $Li_xNi_aCo_bO_2$ and $Li_2MnO_3$ (note that 0.5≤"x"≤1.5, 0.1≤"a"<1, 0.1≤"b"≤1 and 0.1≤"c"<1). One species of the options is also allowable, or mixing multiple species of the options one another is even permissible. When being multiple species of the options, the multiple species are also allowed to form a solid solution. Moreover, when being a ternary-system positive-electrode active material including all of Ni, Co and Mn, a desirable ternary-system positive-electrode active material has the subscripts making "a" "b"+"c"≤1. Among the options, the $Li_xNi_aCo_bMn_cO_2$ is especially preferable. Modifying parts of surface of the Li compounds or solid solutions is also allowable. Moreover, covering parts of the surface with an inorganic substance is even permissible. In the instances, the modified surface, and the covering inorganic substance are inclusively referred to as the "positive-electrode active-material particles."

Moreover, the positive-electrode active materials are also allowed to further include a hetero-atom doped into the crystal structure. An element to be doped, and an amount of the doped element are not limited at all; however, as the element, one or more members are preferably selected from the group consisting of Mg, Zn, Ti, V, Al, Cr, Zr, Sn, Ge, B, As, and Si; and a preferable amount of the element to be doped is from 0.01 to 5% by mass with respect to 100% by mass of the positive-electrode active material.

The binding portion is a part formed by a binder having undergone drying, binds the positive-electrode active-material particles together one another, or binds the positive-electrode active-material particles together with the current collector. A desirable polymer coating layer is formed onto at least part of the binding portion. Since the thus formed polymer coating layer protects the binding portion to be enhanced more in the binding strength, the polymer coating layer enables the positive-electrode active-material layer to be protected from cracking or coming off even after such a severe cycle test as being conducted under a high temperature and a high voltage.

Although the positive-electrode active-material layer includes a conductive additive commonly, a desirable polymer coating layer is formed on at least part of the conductive additive as well. The thus formed desirable polymer coating layer enables an electrolytic solution to be protected from the conductive additive raised to a high potential.

The polymer coating layer includes an amino group, and a phosphoric-acid group. Although the polymer coating layer is allowed to include the amino group and phosphoric-acid group within an identical polymer, the polymer coating layer preferably includes multiple species of polymers like a polymer with an amino group and another polymer with a phosphoric-acid group. As for an amino-based polymer with an amino group, the following are exemplified: polyethylene imine, polyallylamine, polyvinylamine, polyaniline, poly diallyldimethylammonium chlorides, and the like. Moreover, for a phosphoric-acid-based polymer with a phosphoric-acid group, a polymer expressed by a general formula shown in Chemical Formula 1 is usable, for instance.

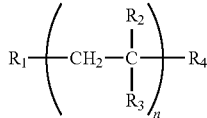

(Chemical Formula 1)

$$R_1 \left( -CH_2 - \underset{\underset{R_3}{|}}{\overset{\overset{R_2}{|}}{C}} - \right)_n R_4$$

In Chemical Formula 1, "$R_1$," "$R_2$," and "$R_4$" are an arbitrary functional group, and are preferably any of functional groups like —H, —CH$_3$, —COOH and —OH, respectively. "$R_3$" includes a phosphoric-acid group at least, and is also allowed to further include an alkyl group, an aryl group or a glycol group, and the like, in addition to a phosphoric-acid group.

A preferable phosphoric-acid-based polymer has a number average molecular weight falling in a range of from 100 to 2,000,000, and the number average molecular weight more preferably falls in a range of from 1,000 to 500,000. When the molecular weight is smaller than the range, such a fear arises probably as the adhesiveness declines; whereas, when the molecular weight becomes larger than the range, such a case arises probably as unevenness occurs in the film formation.

A ratio between the amino-based polymer and phosphorous-acid-based polymer within the polymer coating layer, namely, a ratio of the amino-based polymer to the phosphoric-acid-based polymer (i.e., (Amino-based Polymer)/(Phosphoric-acid-based Polymer)), preferably falls in a range of from 1/1000 to 1000/1, or more preferably falls in a range of from 1/100 to 100/1, by weight. When a proportion of the phosphoric-acid-based polymer deviates from the range, such a case arises probably as causing the advantage resulting from the phosphoric-acid-based polymer to take effect becomes difficult.

Although the polymer coating layer is formable from a mixture of the amino-based polymer and phosphoric-acid-based polymer, such a drawback arises probably as the joining resulting from a coulomb force between the polymer coating layer and the positive-electrode active material weakens. Hence, the following are desirable: the amino-based polymer, which is cationic, is first formed as a film on the positive-electrode active material, which exhibits a negative zeta potential, by an electrostatic interaction, and subsequently a phosphoric-acid-based polymer coating layer is formed of the phosphoric-acid-based polymer which is anionic. In the instance, too, a ratio between the amino-based polymer layer and phosphoric-acid-based polymer layer is preferably set to fall in the above-mentioned range by weight.

The polymer coating layer desirably includes at least one optional metal selected from the group consisting of alkali metals, alkaline-earth metals and rare-earth elements. As for the alkali metal, Li is desirable especially. As for the alkali-earth metal, Mg is desirable especially. As for the rare-earth element, La is desirable especially. A preferable content of the optional metal in the polymer coating layer falls in a range of from 0.1 to 90% by mass, and an especially desirable content thereof falls in a range of from 1 to 50% by mass. When the content of the optional metal is less than 0.1% by mass, the advantages resulting from containing the optional metal are not caused to take effect; whereas, when the content exceeds 90% by mass, such a case arises probably as forming a uniform coating layer becomes difficult.

To form the polymer coating layer including an optional metal, using CVD methods or PVD methods, and the like, is feasible. However, the methods are not said to be preferable in view of costs, and the methods do not make including optional metals easy, either. Hence, the polymer coating layer is preferably formed as follows: a mixed solution, which comprises a solvent and a mixture of the amino-based polymer, or the phosphoric-acid-based polymer, and a compound of an optional metal dissolved in the solvent, is applied onto the positive-electrode active-material layer and then drying the mixed solution thereon. As for the compound of an optional metal, the compound is not at all restricted especially as far as being compounds dissolving in the solvent. An allowable compound is a salt comprising an optional metal. As for such a salt, nitrates or acetates, and so on, are usable.

As for the solvent of a polymer solution, water, or an organic solvent being capable of dissolving the amino-based polymer, or the phosphoric-acid-based polymer, and an optional-metal compound, if needed, is usable. To the organic solvent, any restrictions are not at all imposed especially, and even a mixture of multiple solvents does not matter at all. For example, the following are usable: alcohols, such as methanol, ethanol and propanol; ketones, such as acetone, methyl ethyl ketone and methyl isobutyl ketone; esters, such as ethyl acetate and butyl acetate; aromatic hydrocarbons, such as benzene and toluene; DMF; N-methyl-2-pyrrolidone; mixed solvents of N-methyl-2-pyrrolidone and an ester-based solvent (such as ethyl acetate, n-butyl acetate, butyl cellosolve acetate, or butyl carbitol acetate) or a glyme-based solvent (such as diglyme, triglyme, or tetraglyme). A desirable organic solvent is an organic solvent of which the boiling point is so low as to be readily removed from the polymer coating layer.

In applying a polymer solution, although applying the polymer solution with a spray, roller or brush, and the like, is allowable, the polymer solution is applied desirably by a dipping method in order to uniformly apply the polymer solution onto the surface of a positive-electrode active material. When the polymer solution is applied by a dipping method, since voids or gaps between the respective positive-electrode active-material particles are impregnated with the polymer solution, the polymer coating layer is formable onto almost all the entire surface of the positive-electrode active-material particles. Therefore, the polymer coating layer enables the positive-electrode active material and an electrolytic solution to be securely prevented from contacting directly with each other.

Two methods are available as the method of applying the polymer solution by the dipping method. First of all, a slurry including the positive-electrode active material and a binder at least is bound together onto a current collector to form a positive-electrode precursor, and the positive-electrode precursor is immersed into the polymer solution and is then taken up therefrom to dry. The operations are repeated, if needed, thereby forming the polymer coating layer with a predetermined thickness.

As another method, a powder of the positive-electrode active material is first admixed with the polymer solution, and then the admixture is dried by a freeze-drying method, and the like. The operations are repeated, if needed, thereby forming the polymer coating layer with a predetermined thickness. Thereafter, a positive electrode is formed using the positive-electrode active material with the polymer coating layer formed.

A preferable thickness of the polymer coating layer falls in a range of from 0.1 nm to 100 nm, a more preferable thickness thereof falls in a range of from 0.1 nm to 10 nm, and an especially desirable thickness thereof falls in a range of from 0.1 nm to 5 nm. When a thickness of the polymer coating layer is too thin, such a case probably arises as the positive-electrode active material contacts directly with an electrolytic solution. Moreover, a thickness of the polymer coating layer is on an order of micrometers or more, the ion-conducting property declines because the resistance of a positive electrode increases when a secondary battery comprises the positive electrode with the polymer coating layer. To form such a thin polymer coating layer, the concentration of a polymer is kept low in the above-mentioned dipping solution (i.e., the polymer solution), thereby enabling a thin and uniform polymer coating layer to be formed.

Although an allowable polymer coating layer covers at least parts of surface of the positive-electrode active-material particles, a preferable polymer coating layer covers almost all faces of the positive-electrode active-material particles in order to prevent the positive-electrode active-material particles from contacting directly with an electrolytic solution.

A preferable concentration of a polymer is set at 0.001% by mass or more and less than 2.0% by mass in the polymer solution, and a desirable concentration thereof falls in a range of from 0.1% by mass to 0.5% by mass therein. When the concentration is too low, a long time comes to be needed for the coating operation because the contact probability is low between the polymer and the positive-electrode active material; whereas, when the concentration is too high, such a case probably arises as electrochemical reactions have been hindered on a positive electrode.

Inside the polymer coating layer, further including a lithium compound exhibiting a higher oxidation-reaction potential than does a carbonate-based electrolytic solution is also preferable. The phrase, "further including a lithium compound exhibiting a higher oxidation-reaction potential than does a carbonate-based electrolytic solution," designates involving a lithium compound exhibiting a higher oxidation-reaction potential than does a carbonate-based electrolytic solution therein. Further including such a lithium compound leads to further upgrading the property of voltage resistance, and accordingly to upgrading the cyclability of a lithium-ion secondary battery. Note herein that the term, "oxidation-reaction potential," means a potential at which an oxidation reaction begins, that is, an onset voltage of decomposition. Such an oxidation-reaction potential shows different values depending on types of organic solvents in electrolytic solutions used for lithium-ion secondary batteries. In the present invention, the term, "oxidation-reaction potential," is meant to be a value expressed when an oxidation-reaction potential is measured using a carbonate-based solvent as an organic solvent in an electrolytic solution.

As for a lithium compound exhibiting a higher oxidation-reaction potential than does a carbonate-based electrolytic solution, the following are exemplified: lithium bis(pentafluoroethylsulfonyl)imide (or LiBETI), lithium bis(trifluoromethylsulfonyl)imide (or LiTFSI), $LiBF_4$, $LiCF_3SO_3$, and the like. A preferable content of the lithium compound in the polymer coating layer falls in a range of from 10 to 80% by mass, and an especially desirable content thereof falls in a range of from 40 to 60% by mass. When a content of the lithium compound is less than 10% by mass, the advantages resulting from containing the lithium compound are not caused to take effect; whereas, when the content exceeds 80% by mass, such a case arises probably as forming a uniform coating layer involving the lithium compound therein becomes difficult.

Including the aforementioned lithium compound in the polymer coating layer is enabled to be readily carried out by the following operations, for instance: immersing an electrode with the polymer coating layer formed into a solution comprising the aforementioned lithium compound dissolved in a solvent, and then taking up the electrode therefrom to dry.

Note that the "zeta potential" referred to in the present invention is a zeta potential measured by a microscope electrophoretic method, a rotary diffraction grating method, a laser Doppler electrophoretic method, an ultrasonic vibration potential (or UVP) method, or an electrodynamic acoustic (or ESA) method. An especially preferable zeta potential is a zeta potential measured by the laser Doppler electrophoretic method. (Specific measurement conditions are explained below, but are not limited to the following. First of all, DMF, acetone or water was set as a solvent, and then a solution (or a suspension liquid) with a solid-content concentration of 0.1% by weight was prepared. The measurement of a zeta potential of the solution was carried out three times at a temperature of 25° C. The zeta potential was found by computing the average value. Moreover, regarding a pH of the solution, the pH was set under the neutral condition.)

Cross-linking a polymer within the polymer coating layer is also preferable. Cross-lining the polymer results in making a high-density polymer coating layer formable. As for a cross-linking agent, although any restrictions are not at all imposed thereto especially, cross-linking agents, such as epoxy, isocyanate, acrylate and methacrylate, are exemplified.

Since the thus formed polymer coating layer has high joining strength to the positive-electrode active material, the polymer coating layer enables direct contacts between the positive-electrode active material and an electrolytic solution to be inhibited at the time of a high-voltage driving mode or operation. Moreover, when the polymer coating layer has a total thickness on an order of nanometers, inhibiting the polymer coating layer from making a resistance against the lithium-ion electrically-conducting property is also possible. Therefore, inhibiting decompositions of the electrolytic solution resulting from a high-voltage driving mode or operation is possible, and thereby a lithium-ion secondary battery, which not only exhibits a high capacity but also is able to maintain high battery characteristics even after a repetitive charging/discharging mode or operation, is providable.

As for a binder constituting the binding portion included in the positive-electrode active-material layer, the following are exemplified: polyvinylidene fluoride (e.g., polyvinylidene difluoride (or PVdF)), polytetrafluoroethylene (or PTFE), styrene-butadiene rubber (or SBR), polyimide (or PI), polyamide-imide (or PAI), carboxymethyl cellulose (or CMC), polyvinylchloride (or PVC), methacrylic resins (or PMA), polyacrylonitrile (or PAN), modified polyphenylene oxide (or PPO), polyethylene oxide (or PEO), polyethylene (or PE), polypropylene (or PP), and the like. To the extent of not impairing the characteristics as a binder for positive electrode, blending one of the following, or combining two or more of the following to blend is also allowable: curing agents (such as epoxy resins, melamine resins, polyblock isocyanate, polyoxyazoline and polycarbodiimide); and various additives (such as ethylene glycol, glycerin, polyether polyol, polyester polyol, acrylic oligomers, phthalate esters, dimeric-acid modified substances, and polybutadiene-based compounds).

The amino-based polymer constituting the polymer coating layer is desirably an amino-based polymer with a favorable covering property to the binding portion. Therefore, for the binder, using a binder exhibiting a negative zeta potential is preferable. For example, since the zeta potential of polyvinylidene fluoride (e.g., PVdF) is negative, the amino-based polymer, which is cationic, upgrades in the covering property.

Moreover, the larger a potential difference between the binder and the amino-based polymer is, the more preferable the combination is. Therefore, when polyvinylidene fluoride (e.g., PVdF) is used for the binder, the following setting is preferable: using polyethylene imine (or PEI) for the amino-based polymer; and selecting a solvent so as to make a zeta potential +20 mV or more.

Moreover, including a conductive additive in the positive-electrode active-material layer is also preferable. The conductive additive is added in order to enhance the electrically-conducting property of an electrode. As the conductive additive, the following are addable independently, or two or more of the following are combinable to add: carbonaceous fine particles, such as carbon black, graphite, and acetylene black (or AB); and gas-phase-method carbon fibers (or vapor-grown carbon fibers (or VGCF)). Although an employment amount of the conductive additive is not at all restrictive especially, setting the employment amount is possible at from 2 to 100 parts by mass approximately with respect to 100-part-by-mass active materials, for instance. When an amount of the conductive additive is less than 2 parts by mass, conductive passes with good efficiency are not formable; whereas, when the amount exceeds 100 parts by mass, not only the formability of an electrode worsens but also the energy density thereof becomes low.

A lithium-ion secondary battery according to the present invention comprises the present positive electrode. For a negative electrode and electrolytic solution, publicly-known negative electrodes and electrolytic solutions are usable. The negative electrode comprises a current collector, and a negative-electrode active-material layer bound together onto the current collector. The negative-electrode active-material layer includes a negative-electrode active material, and a binder at least; but the negative-electrode active-material layer further including a conductive additive is also allowable. As for the negative-electrode active material, publicly-known negative-electrode active materials, such as graphite, hard carbon, silicon, carbon fibers, tin (Sn) and silicon oxide, are usable. Moreover, a silicon oxide expressed by $SiO_x$ (where $0.3 \leq "x" \leq 1.6$) is also usable. Each of particles in a powder of the silicon oxide is composed of $SiO_x$ having been decomposed into fine Si, and $SiO_2$ covering the Si by a disproportionation reaction. When the "x" is less than the lower-limit value, volumetric changes become too large at the time of charging and discharging modes or operations because the Si ratio becomes so high, and thereby cyclability declines. Moreover, when the "x" exceeds the upper-limit value, the Si ratio declines so that energy density comes to decline. A preferable range is $0.5 \leq "x" \leq 1.5$, and a more desirable range is $0.7 \leq "x" \leq 1.2$.

In general, when being put under such a condition that oxygen is cut off, almost all of SiO has been said to be disproportionated to separate into two phases at 800° C. or more. To be concrete, a silicon-oxide powder, which includes two phases, namely, a noncrystalline $SiO_2$ and a crystalline Si phase, is obtainable by carrying out to a raw-material silicon-oxide powder including a noncrystalline SiO powder a heat treatment at from 800 to 1,200° C. for from 1 to 5 hours in an inert atmosphere, such as in a vacuum or in an inert gas.

Moreover, as the silicon oxide, a composite is usable, composite in which a carbon material is composited with the $SiO_x$. When the entire silicon oxide is taken as 100% by mass, an allowable composited amount of the carbon material is from 1 to 50% by mass. Compositing a carbon material upgrades cyclability. When a composited amount of the carbon material is less than 1% by mass, the advantageous effect of upgrading conductivity is not obtainable; whereas, when the composited amount exceeds 50% by mass, a proportion of the $SiO_x$ decreases relatively so that the capacity of a negative electrode has declined. A preferable composited amount of the carbon material falls in a range of from 5 to 30% by mass, and a more desirable composite amount thereof falls in a range of from 5 to 20% by mass, when the entire silicon oxide is taken as 100% by mass. A CVD method, or the like, is utilizable to composite the carbon material with the $SiO_x$.

A desirable silicon-oxide powder has an average particle diameter falling in a range of from 1 μm to 10 m. When the average particle diameter is larger than 10 g m, the charging and discharging characteristics of a nonaqueous-system secondary battery decline; whereas, when the average particle diameter is smaller than 1 μm, such a case arises probably that the charging and discharging characteristics of a non-aqueous-system secondary battery decline similarly because the powder agglomerates to make coarse particles.

For a current collector, binder and conductive additive in the negative electrode, the same current collector, binder and conductive additive as the current collector, binder and conductive additive used in the positive-electrode active-material layer are usable.

In the lithium-ion secondary battery according to the present invention using the above-mentioned positive electrode and negative electrode, publicly-known electrolytic solutions and separators are usable without any special limitations at all. An electrolytic solution is a solution in which a lithium metallic salt, namely, an electrolyte, has been dissolved in an organic solvent. The electrolytic solution is not at all limited especially. As the organic solvent, an aprotic organic solvent is usable. For example, at least one member selected from the group consisting of the following is usable for the organic solvent: propylene carbonate (or PC), ethylene carbonate (or EC), dimethyl carbonate (or DMC), diethyl carbonate (or DEC), ethyl methyl carbonate (or EMC), and the like. Moreover, as for an electrolyte to be dissolved, a lithium metallic salt (such as $LiPF_6$, $LiBF_4$, $LiAsF_6$, LiI, $LiClO_4$ or $LiCF_3SO_3$) being soluble in the organic solvent is usable.

For example, the following solution is employable: a solution comprising a lithium metallic salt, such as $LiClO_4$, $LiPF_6$, $LiBF_4$ or $LiCF_3SO_3$, dissolved in a concentration of from 0.5 mol/L to 1.7 mol/L approximately in an organic solvent, such as ethylene carbonate, dimethyl carbonate, propylene carbonate or diethyl carbonate. Among the lithium metallic salts, using $LiBF_4$ is desirable. Since not only using the positive electrode with the polymer coating layer but also including $LiBF_4$ in the electrolytic solution result in making such an advantageous effect as the electrolyte becomes less likely to be decomposed obtainable synergistically, much higher battery characteristics are maintainable even after being charged and discharged repetitively in a high-voltage driving mode or operation.

The separator is one of the constituent elements isolating the positive electrode and negative electrode from one another and retaining the electrolytic solution therein, and accordingly a thin macroporous membrane, such as polypropylene or polyethylene, is usable. Moreover, providing the macroporous membrane with a heat-resistant layer of which the major component is an inorganic substance is also allowable. As for the inorganic substance to be used, aluminum oxide, or titanium oxide is preferable.

A lithium-ion secondary battery according to the present invention is not at all limited especially in the configuration, and accordingly various configurations, such as cylindrical types, laminated types and coin types, are adoptable. Even when any one of the configurations is adopted, the separators are interposed or held between the positive electrodes and the negative electrodes to make electrode assemblies. Then, after connecting intervals from the positive-electrode current collectors and negative-electrode current collectors up to the positive-electrode terminals and negative-electrode terminals, which lead to the outside, with leads, and the like, for collecting electricity, the electrode assemblies are sealed hermetically in a battery case along with the electrolytic solution, thereby turning the positive-electrode and negative-electrode assemblies into a battery.

The embodiment modes of the present invention are hereinafter explained in more detail while giving examples thereof.

First Example

Making of Positive Electrode

A mixed slurry including $LiNi_{0.5}Co_{0.2}Mn_{0.3}O_2$ serving as a positive-electrode active material in an amount of 94 parts by mass, acetylene black (or AB) serving as a conductive additive in an amount of 3 parts by mass and polyvinylidene fluoride (or PVdF) serving as a binder in an amount of 3 parts by mass was applied onto the surface of an aluminum foil (i.e., a current collector) using a doctor blade, and was then dried to form a positive-electrode active-material layer with a thickness of about 40 μm.

Polyethyleneimine (or PEI) of which the molecular weight was 1,800 was dissolved so as to make a concentration of 1% by mass in ethanol, thereby preparing an amino-based polymer solution. The aforementioned positive electrode was immersed into the amino-based polymer solution at 25° C. for 10 minutes, and was thereafter washed with ethanol, thereby obtaining a positive electrode with an amino-based polymer coating layer.

Subsequently, a phosphoric-acid-based polymer shown in Chemical Formula 2 and with a number average molecular weight of 5,000 was dissolved in ethanol so as to make a concentration of 0.01% by mass therein, thereby preparing a phosphoric-acid-based polymer solution. And, the positive electrode with the amino-based polymer coating layer was immersed into the phosphoric-acid-based polymer solution at 25° C. for 10 minutes, and was thereafter washed with ethanol, thereby forming a phosphoric-acid-based polymer coating layer thereon.

(Chemical Formula 2)

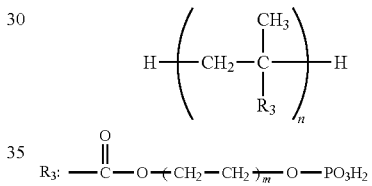

Thereafter, the positive electrode with the amino-based polymer coating layer and phosphoric-acid-based polymer coating layer was vacuum dried at 120° C. for 12 hours to obtain a positive electrode with a polymer coating layer thereon.

When the positive electrode underwent a measurement, using a transmission electron microscope ("H9000NAR" produced by HITACHI HIGH TECHNOLOGIES Corporation), with an acceleration voltage of 200 kV and at a magnification of 2.05 million times, a polymer coating layer with a thickness of about 0.8 nm was observed to cover a positive-electrode active-material particle. Note that the above-described particle diameters, 2 nm±0.3 nm, were the particle diameters of polymers swollen by the solvent; whereas about 0.8 nm, the thickness of the coating layer, was the post-drying thickness.

Making of Negative Electrode

First of all, an SiO powder produced by Sigma Aldrich Japan Corporation and exhibiting an average particle diameter of 5 μm was heat treated at 900° C. for two hours, and thereby an $SiO_x$ powder with an average particle diameter of 5 μm was prepared. Note that, when $SiO_x$ is homogenous, solid silicon monoxide (SiO) of which the ratio between Si and O is 1:1 roughly, the heat treatment leads to decomposing the SiO into two phases, an Si phase and an $SiO_2$ phase, by the internal reactions of solid. The Si phase obtained by separation is very fine.

A slurry was prepared by mixing the following one another: the $SiO_x$ powder in an amount of 32 parts by mass; natural graphite in an amount of 50 parts by mass; acetylene black (or AB) serving as a conductive additive in an amount of 8 parts by mass; and polyamide-imide serving as a binding agent in an amount of 10 parts by mass. The slurry was applied onto the surface of a 18-μm-thickness electrolyzed copper foil (i.e., a current collector) using a doctor blade, and thereby a negative electrode with a negative-electrode active-material layer in a thickness of about 15 μm on the copper foil was obtained.

Fabricating of Lithium-Ion Secondary Battery

For a nonaqueous electrolytic solution, the following electrolytic solution was used: an electrolytic solution comprising: a mixed organic solvent composed of fluoroethylene carbonate (or FEC), ethylene carbonate (or EC), methyl ethyl carbonate (MEC) and dimethyl carbonate (or DMC) mixed one another in a ratio of 4:26:30:40 by volumetric percentage; and 1-mol/L $LiPF_6$ and 0.01-mo/L $LiPF_2(C_2O_4)_2$ dissolved in the mixed organic solvent.

And, between the above-mentioned positive electrode and negative electrode, a microporous polypropylene/polyethylene/polypropylene laminated film with a thickness of 20 μm was interposed or held as a separator to make an electrode assembly. The electrode assembly was wrapped up with a laminate film made of polypropylene, and was then heat welded around the periphery to fabricate a film-pouched battery. Before heat welding the last side to seal, the above-mentioned nonaqueous electrolytic solution was injected into the film-pouched battery to impregnate the electrode assembly with the nonaqueous electrolytic solution, thereby fabricating a lithium-ion secondary battery according to the present example.

Second Example

Using a phosphoric-acid-based polymer solution comprising the phosphoric-acid-based polymer dissolved in ethanol so as to make a concentration of 0.05% by mass therein, a phosphoric-acid-based polymer coating layer was formed. Other than the polymer solution, a positive electrode with a polymer coating layer was formed in the same manner as the first example. Using the positive electrode, a lithium-ion secondary battery according to a second example was fabricated in the same manner as the first example.

Third Example

Using a phosphoric-acid-based polymer solution comprising the phosphoric-acid-based polymer dissolved in ethanol so as to make a concentration of 0.2% by mass therein, a phosphoric-acid-based polymer coating layer was formed. Other than the polymer solution, a positive electrode was formed in the same manner as the first example. Using the positive electrode, a lithium-ion secondary battery according to a third example was fabricated in the same manner as the first example.

Fourth Example

Using an amino-based polymer solution comprising lanthanum nitrate dissolved in ethanol so as to make 2.5 millimol/L and further comprising the polyethyleneimine (or PEI) dissolved in the ethanol so as to make a concentration of 1% by mass therein, an amino-based polymer coating layer including lanthanum (La) was formed. And, using a phosphoric-acid-based polymer solution comprising the phosphoric-acid-based polymer dissolved in ethanol so as to make a concentration of 0.2% by mass therein, a phosphoric-acid-based polymer coating layer was formed. Other than the polymer solutions, a positive electrode with a polymer coating layer was formed in the same manner as the first example. Using the positive electrode, a lithium-ion secondary battery according to a fourth example was fabricated in the same manner as the first example.

Note that, when the lanthanum nitrate was first dissolved in the ethanol and subsequently the polyethyleneimine (or PEI) was dissolved therein in preparing the aforementioned amino-based polymer solution, the solution became transparent after the solution had become clouded instantaneously. When the mixed amino-based polymer solution was analyzed using a grain-size distribution measuring instrument (e.g., "NANO ANALYZER SZ-100" produced by HORIBA Corporation), fine particles with particles diameters falling in an extremely narrow range of 2 nm±0.3 nm were found out to exist. Lanthanum ions coordinating to the polyethyleneimine were inferred to lead to forming the fine particles.

First Comparative Example

Except that no polymer coating layer was formed, a positive electrode was formed in the same manner as the first example. Using the positive electrode, a lithium-ion secondary battery according to a first comparative example was fabricated in the same manner as the first example.

Second Comparative Example

After forming an amino-based polymer coating layer in the same manner as the first example, a polyacrylic-acid coating layer was formed using a polyacrylic acid of which the number average molecular weight was 25,000, instead of the phosphoric-acid-based polymer. Other than the polyacrylic-acid coating layer, a positive electrode with a polymer coating layer was made in the same manner as the first example. Using the positive electrode, a lithium-ion secondary battery according to a second comparative example was fabricated in the same manner as the first example.

Third Comparative Example

An amino-based polymer coating layer including lanthanum (La) was formed in the same manner as the fourth example, and thereafter a polyacrylic-acid polymer coating layer was formed in the same manner as the second comparative example. Other than the La-including amino-based polymer coating layer and polyacrylic-acid coating layer, a positive electrode with a polymer coating layer was made in the same manner as the first example. Using the positive electrode, a lithium-ion secondary battery according to a third comparative example was fabricated in the same manner as the first example.

(First Testing Example)

Using the lithium-ion secondary batteries according to the first through fourth examples and the first through third comparative examples, a cycle test was carried out. In the cycle test, a cycle composed of steps described below was repeated 200 cycles: each of the batteries was charged up to 4.32 V under such conditions that the temperature was set at 25° C. and a CCCV charging mode was carried out at 1 C; each of the batteries took a pause for 10 minutes after the charging mode; each of the batteries was then discharged at 3.26 V in a CC discharging mode carried out at 1 C; and each of the batteries took another pause for another 10 minutes after the discharging mode.

For the prior-to-cycle-test and post-cycle-test batteries, load characteristics were measured, respectively, after each of the batteries underwent the following steps: charging up to 4.5 V under such conditions that the temperature was set at 25° C. and a CCCV charging mode was carried out at 1 C; taking a pause for 10 minutes after the charging mode; discharging at 2.5V in a CC discharging mode carried out at 0.33 C; and taking another pause for another 10 minutes after the discharging mode.

The batteries were measured for capacity maintained ratios at the 100th cycle and 200th cycle, respectively. Table 1 shows the results. Note that the "capacity maintained ratio" is a value found by a percentage value which is obtained by dividing an "N"th-cycle discharged capacity by a first-round discharged capacity (i.e., {("N"th-cycle Discharged Capacity)/(First-round Discharged Capacity)}× 100).

Moreover, the batteries were measured for 20%-SOC (i.e., state-of-charge) discharge resistances at 25° C. during the first round, 100th cycle and 200th cycle, respectively. Note that the "20%-SOC discharge resistances" were determined as follows: charging the batteries up to 20%-SOC; discharging the batteries thereafter at 3 C for 10 seconds; and finding 10-second resistances, respectively, by the following calculating formula, thereby computing resistance increased ratios. Table 1 shows the results.

(10-second Resistance)=(Voltage Drop Magnitude over 10 Seconds)/(Current Value at 3 C)

Note that the "resistance increased ratio" is a value found by a percentage value which is obtained by dividing a subtracted value, which has been found by subtracting a first-round 10-second resistance from an "N"th-cycle 10-second resistance, by the first-round 10-second resistance (i.e., [{("N"th-cycle 10-second Resistance)−(First-round 10-second Resistance)}/(First-round 10-second Resistance)]×100).

The lithium-ion secondary battery directed to the first example had high capacity maintained ratios and extremely low resistance increased ratios as well, compared with the lithium-ion secondary batteries directed to the first and second comparative examples. That is, the lithium-ion secondary battery directed to the first example exhibited an excellent cyclability even in such a severe test under the high-voltage driving mode or operation. The superb cyclability was an advantageous effect resulting from using the phosphoric-acid-based polymer instead of the polyacrylic acid.

Moreover, from the comparison between the first through third examples, such a tendency was appreciated that the resistance increased ratios also became high, even though the thicker the film thickness of the phosphoric-acid-based polymer coating layer became the higher the capacity maintained ratios became.

In addition, from the comparison between the third and fourth examples and the second and third comparative examples, the following were apparent: adding lanthanum (La) to the amino-based polymer coating layer led to heightening the capacity maintained ratios, and to lowering the resistance increased ratios. Thus, adding lanthanum was found out to be extremely effective to upgrade the cyclability. And, the lithium-ion secondary battery directed to the fourth example apparently exhibited an extremely excellent cyclability, because the lithium-ion secondary battery had an extremely low resistance increased ratio even after 200 cycles.

Second Testing Example

The lithium-ion secondary batteries according to the first through fourth examples, and the lithium-ion secondary batteries according to the first through third comparative examples were retained within a 60° C. furnace for 6 days and 12 days after the lithium-ion secondary batteries had been charged up to a battery voltage of 4.32 V under such conditions that a CCCV charging mode (with a CCCV operation incorporated) was carried out at 1 C for 2.5 hours at a temperature of 25° C.

TABLE 1

| | Polymer Coating Layer | Capacity Maintained Ratio (%) | | Resistance Increased Ratio (%) | |
|---|---|---|---|---|---|
| | | 100th Cycle | 200th Cycle | 100th Cycle | 200th Cycle |
| 1st Ex. | Polyethyleneimine & Phosphoric-acid-based Polymer with 0.01% Concentration | 83.7 | 77.0 | −0.9 | 15.8 |
| 2nd Ex. | Polyethyleneimine & Phosphoric-acid-based Polymer with 0.05% Concentration | 83.9 | 77.2 | 7.0 | 23.9 |
| 3rd Ex. | Polyethyleneimine & Phosphoric-acid-based Polymer with 0.2% Concentration | 86.4 | 78.4 | 6.1 | 28.0 |
| 4th Ex. | Polyethyleneimine with La & Phosphoric-acid-based Polymer with 0.2% Concentration | 88.5 | 81.6 | 0.2 | 5.9 |
| 1st Comp. Ex. | — | 79.6 | 71.7 | 57.4 | 100.3 |
| 2nd Comp. Ex. | Polyethyleneimine & Polyacrylic Acid | 83.0 | 73.5 | 54.8 | 80.8 |
| 3rd Comp. Ex. | Polyethyleneimine with La & Polyacrylic Acid | 88.7 | 83.6 | 0.3 | 12.1 |

The post-6-day-preservation batteries, and the post-12-day-preservation batteries were measured for capacity maintained ratios, respectively. Table 2 shows the results. Note that the "capacity maintained ratio" is a value found by a percentage value which is obtained by dividing a post-"N"-day-preservation discharged capacity by a first-round discharged capacity (i.e., {(Post-"N"-day-preservation Discharged Capacity)/(First-round Discharged Capacity)}×100).

Moreover, the prior-to-preservation batteries, the post-6-day-preservation batteries, and the post-12-day-preservation batteries were measured for 20%-SOC (i.e., state-of-charge) discharge resistances at 25° C., respectively. Note that the "20%-SOC discharge resistances" were determined as follows: charging the batteries up to 20%-SOC; discharging the batteries thereafter at 3 C for 10 seconds; and finding 10-second resistances, respectively, by the following calculating formula, thereby computing resistance increased ratios. Table 2 shows the results.

(10-second Resistance)=(Voltage Drop Magnitude over 10 Seconds)/(Current Value at 3 C)

Note that the "resistance increased ratio" is a value found by a percentage value which is obtained by dividing a subtracted value, which has been found by subtracting a first-round 10-second resistance from a post-"N"-day-preservation 10-second resistance, by the first-round 10-second resistance (i.e., [{(Post-"N"-day-preservation 10-second Resistance)−(First-round 10-second Resistance)}/(First-round 10-second Resistance)]×100).

Moreover, from the comparison between the first, second and third examples, the film thickness of the phosphoric-acid-based polymer coating layer hardly had any influence on the capacity maintained ratios. However, the lithium-ion secondary battery directed to the second example exhibited especially low values regarding the resistance increased ratios. Thus, an optimum range was suggested to exist for the film thickness of the phosphoric-acid-based polymer coating layer.

In addition, in the second and third comparative examples, adding lanthanum (La) to the amino-based polymer coating layer led to slightly heightening the capacity maintained ratios, and to lowering the resistance increased ratios. However, from the comparison between the third and fourth examples, adding lanthanum even to the amino-based polymer coating layer was hardly appreciated to exhibit an influence, if any, on the capacity maintained ratios and resistance increased ratios.

Fifth Example

A slurry was prepared by mixing the following one another: graphite in an amount of 97 parts by mass; a powder of acetylene black (or AB) serving as a conductive additive in an amount of 1 part by mass; and a binder comprising a mixture composed of styrene-butadiene rubber (or SBR) and carboxymethyl cellulose (or CMC) in a ratio of 1:1 by mass in an amount of 2 parts by mass. The slurry was applied onto the surface of a 18-μm-thickness electrolyzed copper foil

TABLE 2

| | Polymer Coating Layer | Capacity Maintained Ratio (%) | | Resistance Increased Ratio (%) | |
|---|---|---|---|---|---|
| | | 6-day Preservation | 12-day Preservation | 6-day Preservation | 12-day Preservation |
| 1st Ex. | Polyethyleneimine & Phosphoric-acid-based Polymer with 0.01% Concentration | 91.3 | 86.6 | 5.3 | 5.9 |
| 2nd Ex. | Polyethyleneimine & Phosphoric-acid-based Polymer with 0.05% Concentration | 90.5 | 86.3 | 0.8 | 1.4 |
| 3rd Ex. | Polyethyleneimine & Phosphoric-acid-based Polymer with 0.2% Concentration | 91.1 | 85.6 | 7.2 | 5.7 |
| 4th Ex. | Polyethyleneimine with La & Phosphoric-acid-based Polymer with 0.2% Concentration | 91.3 | 86.6 | 5.3 | 6.0 |
| 1st Comp. Ex. | — | 90.8 | 83.8 | 48.1 | 93.3 |
| 2nd Comp. Ex. | Polyethyleneimine & Polyacrylic Acid | 90.6 | 84.0 | 36.9 | 72.4 |
| 3rd Comp. Ex. | Polyethyleneimine with La & Polyacrylic Acid | 90.8 | 84.3 | 12.7 | 39.0 |

The lithium-ion secondary battery directed to the first example had high post-preservation-test capacity maintained ratios and extremely low resistance increased ratios as well, compared with the lithium-ion secondary batteries directed to the first and second comparative examples. That is, the lithium-ion secondary battery directed to the first example was excellent in the preservation characteristic even in the high-temperature and high-voltage driving mode or operation. The superb preservation characteristic was an advantageous effect resulting from using the phosphoric-acid-based polymer instead of the polyacrylic acid.

(i.e., a current collector) using a doctor blade, thereby forming a negative-electrode active-material layer in a thickness of about 15 μm on the copper foil to obtain a negative-electrode precursor.

Using the negative-electrode precursor, a polymer coating layer was formed to form a negative electrode in the same manner as the third example. Other than using the negative electrode, a lithium-ion secondary battery according to a fifth example was fabricated in the same manner as the first example.

Fourth Comparative Example

After forming an amino-based polymer coating layer in the same manner as the first example, a positive electrode was made in the same manner as the first example, except for not coating the phosphoric-acid-based polymer. Other than using the positive electrode, a lithium-ion secondary battery according to a fourth comparative example was fabricated in the same manner as the fifth example.

Third Testing Example

The lithium-ion secondary battery according to the fifth example, and the lithium-ion secondary battery according to the fourth comparative example were retained within a 60° C. furnace for 6 days and 12 days after the lithium-ion secondary batteries had been charged up to a battery voltage of 4.5 V under such conditions that a CCCV charging mode (with a CCCV operation incorporated) was carried out at 0.330 for 2.5 hours at a temperature of 25° C.

The post-6-day-preservation batteries, and the post-12-day-preservation batteries were measured for capacity maintained ratios, respectively. Table 3 shows the results.

TABLE 3

|  | 5th Ex. | 4th Comp. Ex. |
| --- | --- | --- |
| Post-6-day Capacity Maintained Ratio | 93.5% | 90.2% |
| Post-12-day Capacity Maintained Ratio | 88.0% | 81.5% |
| Fluorine Concentration (atomic %) | 5.19 | 6.87 |

From Table 3, even when the negative electrode comprised graphite serving as an active material, coating the phosphoric-acid-based polymer apparently resulted in upgrading the capacity maintained ratios.

Note that, after the aforementioned test, the respective negative electrodes were analyzed by an energy-dispersion-type X-ray spectroscopic (or EDS) analysis method. Table 3 also shows the results additionally. A difference was appreciated between the fifth example and the fourth comparative example in the fluorine concentrations per unit surface area, namely, the fifth example had a lower fluorine concentration than the fourth comparative example did. That is, coating the phosphoric-acid-based polymer onto the positive electrode was believed to lead to inhibiting fluorine-based deposits from generating on the negative electrode, and thereby the capacity maintained ratios were upgraded.

INDUSTRIAL APPLICABILITY

The positive electrode for lithium-ion secondary battery according to the present invention is useful as positive electrodes for lithium-ion secondary batteries utilized for driving the motors of electric automobiles and hybrid automobiles, and for personal computers, portable communication gadgets, home electric appliances, office devices, industrial instruments, and so forth. In particular, the lithium-ion secondary batteries using the present positive electrode are usable optimally for driving the motors of electric automobiles and hybrid automobiles requiring large capacities and large outputs.

The invention claimed is:

1. A positive electrode for lithium-ion secondary battery comprising:
   a positive-electrode active-material particles;
   a polymer coating layer formed on at least parts of surface of said positive-electrode active-material particles; and
   said polymer coating layer including an amino group, and a phosphoric-acid group.

2. The positive electrode for lithium-ion secondary battery as set forth in claim 1, wherein said polymer coating layer is a composite of an amino-based polymer with an amino group and a phosphoric-acid-based polymer with a phosphoric-acid group on a side chain thereof.

3. The positive electrode for lithium-ion secondary battery as set forth in claim 1, wherein said active-material particles include an Li compound or solid solution selected from the group consisting of $Li_xNi_aCo_bMn_cO_2$, $Li$—$Co_b$-$Mn_cO_2$, $Li_xNi_aMn_cO_2$, $Li_xNi_aCo_bO_2$ and $Li_2MnO_3$ (note that $0.5 \leq \text{"x"} \leq 1.5$, $0.1 \leq \text{"a"} < 1$, $0.1 \leq \text{"b"} < 1$ and $0.1 \leq \text{"c"} < 1$).

4. The positive electrode for lithium-ion secondary battery as set forth in claim 1, wherein a thickness of said polymer coating layer is 10 nm or less.

5. The positive electrode for lithium-ion secondary battery as set forth in claim 1, wherein said positive-electrode active-material particles comprise $Li_xNi_aCo_bMn_cO_2$.

6. The positive electrode for lithium-ion secondary battery as set forth in claim 1, wherein said amino-based polymer with an amino group is polyethyleneimine.

7. A secondary-battery positive-electrode production process for the positive electrode as set forth in claim 1, the production process comprising the steps of:
   forming a positive-electrode active-material layer by applying a slurry onto a surface of a current collector and then drying the slurry thereon, the slurry comprising a binding agent, and positive-electrode active-material particles; and
   forming a cationic polymer coating layer and then forming a phosphoric-acid-based polymer coating layer by applying onto the positive-electrode active-material layer a cationic polymer solution comprising a solvent and a cationic polymer which is dissolved in the solvent and of which the zeta potential is positive under a neutral condition, and then drying the cationic polymer solution, and subsequently applying onto the cationic polymer coating layer a phosphoric-acid-based polymer solution comprising a solvent and a phosphoric-acid-based polymer, which has a phosphoric-acid group on a side chain thereof and is dissolved in the solvent and of which the zeta potential is negative under a neutral condition, and then drying the phosphoric-acid-based polymer solution.

8. The secondary-battery positive-electrode production process as set forth in claim 7, wherein the step of applying said cationic polymer solution is carried out by a dipping method.

9. The secondary-battery positive-electrode production process as set forth in claim 7, wherein the step of applying said phosphoric-acid-based polymer solution is carried out by a dipping method.

10. The secondary-battery positive-electrode production process as set forth in claim 7, wherein said positive-electrode active-material particles include an Li compound or solid solution selected from the group consisting of $Li_xNi_aCo_bMn_cO_2$, $Li_xCo_bMn_cO_2$, $Li_xNi_aMn_cO_2$, $Li_xNi_aCo_bO_2$ and $Li_2MnO_3$ (note that $0.5 \leq \text{"x"} \leq 1.5$, $0.1 \leq \text{"a"} < 1$, $0.1 \leq \text{"b"} < 1$ and $0.1 \leq \text{"c"} < 1$).

11. A lithium-ion secondary battery comprising said positive electrode for lithium-ion secondary battery as set forth in claim 1.

12. The lithium-ion secondary battery as set forth in claim 11 exhibiting a battery voltage of 4.3 V or more when being charged.

* * * * *